United States Patent [19]

Lumm, Jr.

[11] 3,993,380
[45] Nov. 23, 1976

[54] COMBINED EXTENSION CORD AND GROUNDING DEVICE

[75] Inventor: Benjamin Lumm, Jr., Bay Shore, N.Y.

[73] Assignee: Lawrence Peska Associates, Inc., New York, N.Y. ; a part interest

[22] Filed: Jan. 21, 1976

[21] Appl. No.: 651,026

[52] U.S. Cl............................ 339/14 RP; 339/8 RL
[51] Int. Cl.²........................................... H01R 3/06
[58] Field of Search............... 339/14 R, 14 L, 14 P, 339/14 RP, 1 R, 5 RL, 6 RL, 8 R, 8 RL, 9 RY, 166 R, 28

[56] References Cited
UNITED STATES PATENTS

| | | | |
|---|---|---|---|
| 1,882,385 | 10/1932 | Johnson | 339/8 RL X |
| 2,979,576 | 4/1961 | Huber | 339/8 RL X |
| 2,984,808 | 5/1961 | Bender | 339/14 RP |
| 3,828,297 | 8/1974 | Hoza | 339/14 R |

*Primary Examiner*—Roy Lake
*Assistant Examiner*—E. F. Desmond
*Attorney, Agent, or Firm*—Jack D. Slobod

[57] ABSTRACT

A combined extension cord and grounding device includes a two conductor cable having a two prong plug at one end and a housing on the other end carrying a three element socket. A grounding wire connected to a ground socket element thereof is wound about a reel within the housing and a free end of the wire exits the housing and is terminated with an alligator clip. A crank handle carried by the housing engages the reel for manual rotation thereof for selective deployment of the grounding wire.

1 Claim, 2 Drawing Figures

COMBINED EXTENSION CORD AND GROUNDING DEVICE

FIELD OF THE INVENTION

The present invention relates generally to extension cord devices. In its particular aspects the present invention relates to an extension cord having a two prong plug at one end and a three element socket at the other end including a grounding wire wound about a reel.

BACKGROUND OF THE INVENTION

Many power tools are provided with a three element plug because of the necessity of grounding the tool for safety reasons. Often, when using such tools, only a two element wall outlet socket is available, and also the outlet may be so remote that an extension cord is required. One solution to such a problem is to use a grounding adapter plug at the wall outlet and a three wire extension cord. However, such adapter plugs are frequently used in an unsafe manner by connection of the ground wire therefrom to the mounting screw of the cover plate of the wall outlet which may not be grounded. Also, three wire extension cords are rather expensive.

OBJECTS OF THE INVENTION

It is an object of the present invention to provide a two wire extension having a two pronged plug at one end and a three element socket at the other end with a ground wire connected to a ground socket element thereof.

It is a further object of the present invention to provide an extension cord having a housing at one end carrying a three element socket having a grounding wire connected thereto and wound about a reel within the housing for selective deployment thereof.

SUMMARY OF THE INVENTION

Briefly, the aforementioned and other objects of the present invention are satisfied by providing a combined extension cord and grounding device including a two conductor extension cord having a two-pronged plug at one end and a housing at its other end.

The housing carries a three element socket including a ground socket element. A grounding wire connected at one end to the ground socket element lies in the housing and is wound about a reel rotatably mounted therein. A free end of the grounding wire exits the housing via an aperture therein and is terminated with a connector clip. For selective deployment of the grounding wire, a crank handle carried by the housing engages the reel via gear means.

Other objects, features and advantages of the present invention will become apparent upon perusal of the following detailed description of the preferred embodiment thereof when taken in conjunction with the appended drawing wherein:

FIG. 1 is a longitudinal view of the combined extension cord and grounding device of the present invention with a portion thereof in cross-section; and FIG. 2 is an end view of the device in FIG. 1.

DETAILED DESCRIPTION

Figure 1:
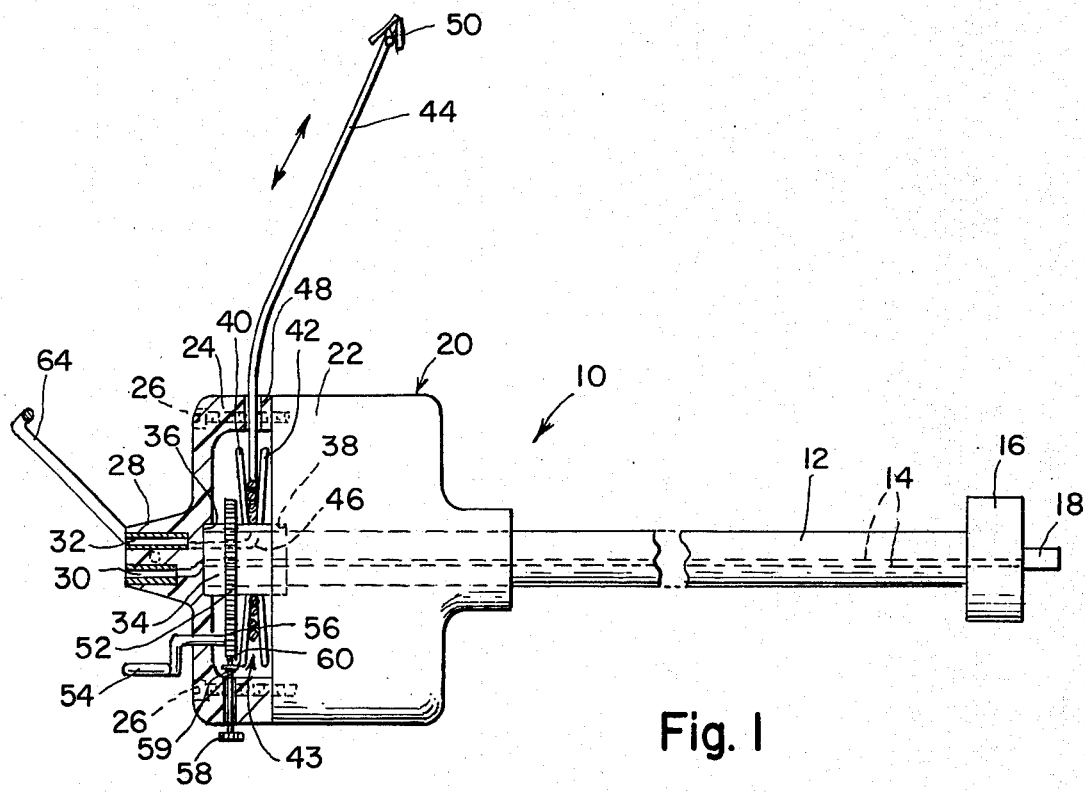
Figure 2:
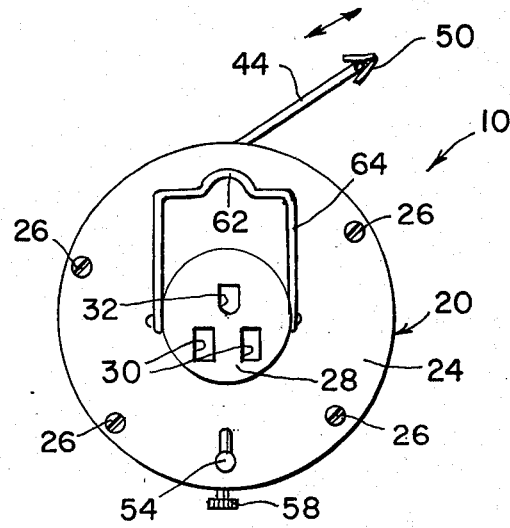

Referring to FIGS. 1 and 2 of the drawing, the combined extension cord and grounding device of the present invention is generally indicated by the reference numeral 10. Device 10 comprises an elongated insulated cable 12 having two conductors 14 running therein. A conventional male plug 16 is carried on one end of cable 12 having two projecting prongs 18 respectively connected to the conductors 14 of cable 12 in the usual manner.

A housing 20 is carried on the other end of cable 12 which includes a first generally cylindrical member 22 having a central bore through which cable 12 passes and a hollow dielectric cap 24 fastened on the end of member 22 via machine screws 26. A frusto-conical boss 28 projects axially and centrally from the end of cap 24 and a conventional three-element electrical receptacle or socket is formed therein composed of two power prong receiving socket elements 30 and a ground socket element 32.

A tubular shaft 34 is axially disposed inside cap 24 with its ends journally for rotation in short opposed circular bores 36 and 38 respectively formed in cap 24 and member 22. The conductors 14 of cable 12 pass axially through the center of tubular shaft 34 and are respectively connected to socket elements 30.

A pair of opposed axially spaced apart radial flanges 40 and 42 projecting integrally from shaft 34 define a spool or reel 43. A grounding wire 44 is connected at one end to ground socket element 32 and passes axially part way through shaft 34 and is directed radially through a transverse aperture 46 between flanges 40, 42. The wire 44 is wound about the reel 43 and exits the cap 24 via a radially directed bore 48 therein. Consequently, the free end of grounding wire 44 emanates from housing 20. For enabling the wire 44 to be electrically connected to a suitable ground point its free end is terminated with an alligator clip 50.

A spin gear portion 52 projects radially and integrally from shaft 34 and a crank handle 54 mounted rotatably through the end of cap 24 carries a spin gear 56 engaging gear portion 52. By rotating handle 54 in the desired direction the grounding wire 44 may be selectively wound into or unwound from reel 43.

A pin 58 is mounted for radial movement through the side of cap 24 and is acted upon by a spring 59 mounted coaxially therewith to urge a pointed end 60 of pin 58 between the teeth of gear 56. This action locks reel 43 and handle 54 from rotating. In order to rotate the handle and reel, pin 24 must be held outwards.

As an additional feature a bail or stirrup 62 of inverted U shape is provided pivotally mounted to opposite sides of boss 28. The bail 62 includes a semicircular bend 64 for engagement about a three-pronged plug of an appliance or power tool received in the socket formed on boss 28 to lock the plug in place.

While the preferred embodiment of the present invention has been described in specific detail, it should be noted that numerous modifications, additions and omissions in the details thereof are possible within the intended spirit and scope of the invention claimed herein.

What is claimed is:

1. A combined extension cord and grounding device comprising:
   an elongated two conductor cable;
   a connector plug at one end of said cable having two projecting prongs respectively connected to said two conductors of said cable;
   a housing carried on the other end of said cable;
   an aperture in the wall of said housing;

a three element connector socket formed on said housing having a pair of socket elements respectively connected to said two conductors of said cable and a ground socket element;
a reel mounted rotatably within said housing;
a grounding wire having the end connected to said ground socket element, said grounding wire passing from said ground socket element and wound about said reel, a free end of said grounding wire exiting said housing via said aperture; and
means carried by said housing for rotating said reel.

* * * * *